US010693541B2

(12) United States Patent
Lee et al.

(10) Patent No.: US 10,693,541 B2
(45) Date of Patent: Jun. 23, 2020

(54) SECTOR SWEEPS FOR ESTABLISHING TWO-WAY DATA COMMUNICATIONS WITH DIRECTIONAL ANTENNAS (71) Applicant: INTEL CORPORATION, Santa Clara, CA (US)

(72) Inventors: Wook Bong Lee, Pleasanton, CA (US); Hosein Nikopour, San Jose, CA (US); Claudio Da Silva, San Ramon, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/078,549

(22) PCT Filed: Mar. 22, 2016

(86) PCT No.: PCT/US2016/023585
§ 371 (c)(1),
(2) Date: Aug. 21, 2018

(87) PCT Pub. No.: WO2017/164846
PCT Pub. Date: Sep. 28, 2017

(65) Prior Publication Data
US 2019/0052326 A1    Feb. 14, 2019

(51) Int. Cl.
H04B 7/0491    (2017.01)
H04B 7/08    (2006.01)
(Continued)

(52) U.S. Cl.
CPC ......... *H04B 7/0491* (2013.01); *H04B 7/0695* (2013.01); *H04B 7/08* (2013.01); *H04B 7/088* (2013.01); *H04W 88/08* (2013.01)

(58) Field of Classification Search
CPC ........ H04B 7/0491; H04B 7/08; H04B 7/088; H04B 7/0695; H04W 88/08
See application file for complete search history.

(56) References Cited

U.S. PATENT DOCUMENTS

2010/0265924 A1    10/2010 Yong et al.
2011/0038308 A1*   2/2011 Song .................. H04B 7/0408
                                                370/328
(Continued)

FOREIGN PATENT DOCUMENTS

WO    2010095061 A1    8/2010

OTHER PUBLICATIONS

International Preliminary Report on Patentability received for PCT Patent Application No. PCT/US2016/023585, dated Oct. 4, 2018, 14 pages.

(Continued)

*Primary Examiner* — Devan A Sandiford
(74) *Attorney, Agent, or Firm* — Womble Bond Dickinson (US) LLP (57) ABSTRACT Sector sweeps are described for establishing two-way data communications with directional antennas. Some examples receive a sequence of base station transmit sector sweep signals from a base station (BS) at the UE, each signal being transmitted to a different transmit sector from a multiple antenna array of the BS, select a best transmitted signal at the UE from among the received signals, send a sequence of UE transmit sector sweep signals to the base station from the UE, each signal being transmitted to a different transmit sector from a multiple antenna array of the UE, send an identification of the selected best base station transmit sector sweep signal to the base station, receive an identification of a selected best UE transmit sector sweep signal from the base station, and send data to the BS using the identified best UE transmit sector.

21 Claims, 7 Drawing Sheets (51) Int. Cl.
*H04B 7/06* (2006.01)
*H04W 88/08* (2009.01)

(56) References Cited

U.S. PATENT DOCUMENTS

| | | | | |
|---|---|---|---|---|
| 2011/0064033 | A1* | 3/2011 | Gong | H04B 7/0617 370/329 |
| 2011/0065448 | A1* | 3/2011 | Song | H04B 7/0632 455/452.2 |
| 2011/0149722 | A1* | 6/2011 | Park | H04L 43/0811 370/216 |
| 2015/0049744 | A1* | 2/2015 | Liu | H04W 72/0446 370/336 |
| 2015/0244432 | A1* | 8/2015 | Wang | H04B 7/0695 375/267 |
| 2017/0134076 | A1* | 5/2017 | Maamari | H04B 7/0452 |
| 2017/0156067 | A1* | 6/2017 | Huang | H04W 16/28 |
| 2017/0352954 | A1* | 12/2017 | Abdallah | H04B 7/088 |
| 2017/0353984 | A1* | 12/2017 | Abdallah | H04B 7/0617 |
| 2018/0088225 | A1* | 3/2018 | Karls | G01S 13/42 |
| 2018/0248603 | A1* | 8/2018 | Kasher | H04B 7/0621 |
| 2019/0053088 | A1* | 2/2019 | Jo | H04W 24/10 |
| 2019/0069215 | A1* | 2/2019 | Abouelseoud | H04W 16/28 |
| 2019/0082379 | A1* | 3/2019 | Abouelseoud | H04W 48/10 |
| 2019/0165983 | A1* | 5/2019 | Nakayama | H04B 7/0413 |
| 2019/0182815 | A1* | 6/2019 | Bang | H04W 72/044 |

OTHER PUBLICATIONS

Korean IP Office—International Search Report by the International Searching Authority for PCT/US2016/023585 dated Dec. 9, 2016 (3 pgs).

Korean IP Office—Written Opinion by the International Searching Authority for PCT/US2016/023585 dated Dec. 9, 2016 (12 pgs).

* cited by examiner

SECTOR SWEEPS FOR ESTABLISHING TWO-WAY DATA COMMUNICATIONS WITH DIRECTIONAL ANTENNAS

CROSS-REFERENCE TO RELATED APPLICATION

This patent application is a U.S. National Phase application under 35 U.S.C. § 371 of International Application No. PCT/US2016/023585, filed on 22 Mar. 2016, entitled SECTOR SWEEPS FOR ESTABLISHING TWO-WAY DATA COMMUNICATIONS WITH DIRECTIONAL ANTENNAS, the contents of which are incorporated herein by reference.

FIELD

The present description relates to the field of wireless communications and, in particular, to establishing directional sectors for use between radio nodes with multiple antennas.

BACKGROUND

With higher frequency bands, wireless data communications suffer higher propagation losses for signals between nodes. In order to improve the signal quality and increase the number of simultaneous radios in a noisy environment, many wireless systems use an antenna array with multiple elements. When the same signal is sent through several antennas, the radio beam can be steered by adjusting the phase of the signal at each antenna. More antennas allow the radio beam to be steered with more precision. The same principle applies to receiving signals where the reception can also be steered. In other words by adjusting the phase a receiving antenna may be made especially sensitive to signal coming from a particular direction.

To obtain the benefits of sending and receiving radio signals in particular direction, each radio node in the wireless system must determine the direction to use for each other radio node. This involves trying different directions until a suitable direction is found. With more antennas in an array and more precise beam steering directions, there are more possible directions to try.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Described embodiments are particularly suitable for multiple antenna array radio communications systems such as that of IEEE 802.11ad, however, the embodiments are not so limited. In such systems, scanning procedures are used to determine a best beam direction or beam sector for communication with each radio node. The directed beams help to overcome propagation losses by focusing the energy in a narrow beam. The scanning procedures are particularly valuable when multiplexing users using the narrow beam width property of a large number of antennas, as proposed for mm Wave services. Collision may be avoided by limiting the number of transmitting users or the order of sectors in a sweep. Reducing the sweep procedures reduces overhead. For example, in the case of 10 users, overhead can be reduced in theory by 260% through an entire sector sweep procedure.

Figure 1:
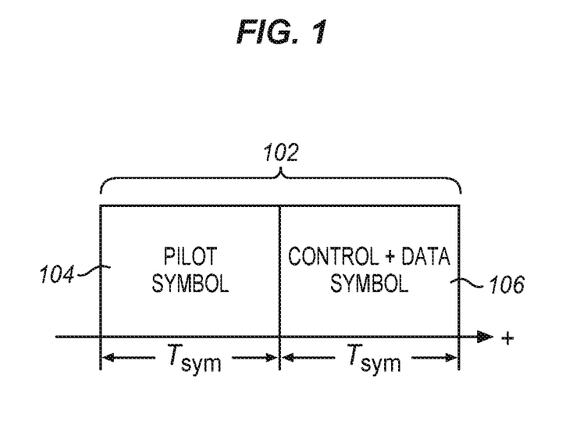
FIG. 1 is a diagram of an example time slot according to an embodiment.

FIG. 1 is a diagram of an example of one type of time slot in a superframe for a radio communications protocol. This time slot will be adapted particularly for use with multiple antenna systems that use sector sweeps. The time slot 102 has a leading pilot symbol section 104 followed by a control and data symbol section 106. The sections may be reversed in order with appropriate changes to the receiver. During the pilot section, a pilot symbol of known bits which may be in a low energy configuration is transmitted for training the receivers. During the control and data section, control and data information is transmitted. This section may have several different parts.

Figure 2:
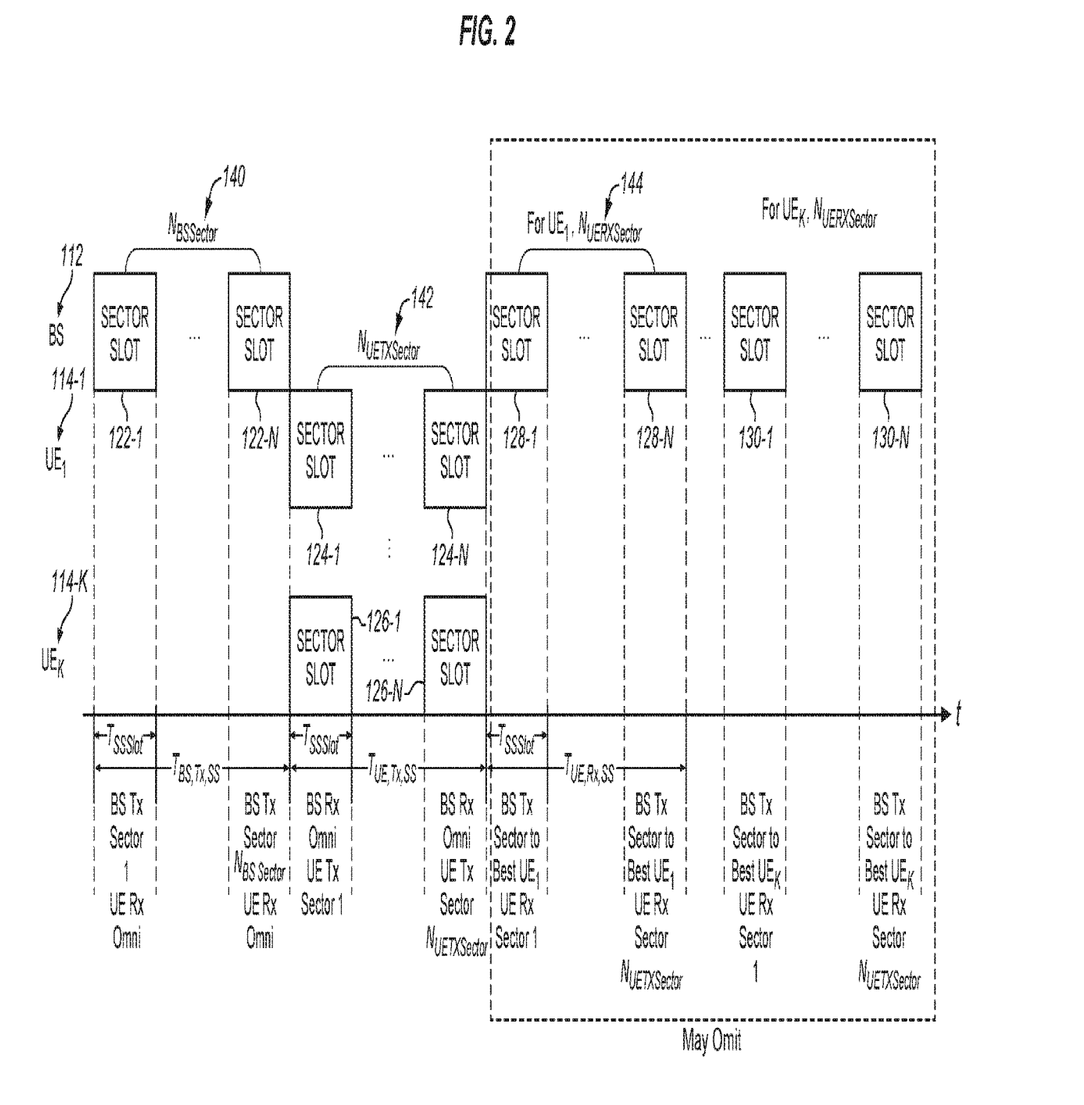
FIG. 2 is a diagram of a sequence of sector sweep slots in a superframe according to an embodiment.

FIG. 2 is a diagram of a sequence of slots in a basic sector sweep procedure. Along the right side vertical band of the diagram is the transmitting node and time is on a horizontal line from right to left. At the top of the right side is the BS 112 or base station, access point, enhanced NodeB (eNB) or other multiple antenna wireless station. Next is each of the UEs from 1 to K (114-1 to 114-K), identified as User Equipment here but may be any other type of wireless stations as peers, mobile devices, or remotes.

A sector sweep procedure begins with a BS transmit sector sweep procedure in which the BS sends a sweep signal 122-1 to 122-M into each of M sectors. Each signal uses a full slot and has a pattern like that shown in FIG. 1, although embodiments are not so limited. The UEs are not transmitting during this time but are receiving using antenna arrays in order to determine the best receive sector and the antenna array parameters that are best to receive in that sector. The BS sector sweep is followed by a Tx sector sweep procedure for each of the UEs simultaneously. Each UE 114-1, 114-K transmits a signal for each of the N sectors. The first UE 114-1 transmits N signals 124-1 to 124-N. The last UE 114-K also transmits a signal for each of the N sectors 126-1 to 126-N. During this portion the BS may be receiving with an omnidirectional pattern in order to analyze the signals from each of the K UEs.

After the UE Tx sector sweep slots 124-1 to 124-N and 126-1 to 126-N, an optional UE Rx sector sweep procedure may be performed. For this process, the BS determines the best receive sector for transmissions from a particular UE. It then transmits a sequence of signals using that sector to the particular UE. Based on reciprocity, the best receive sector at the BS should also be the best transmit sector of the BS for that UE. It transmits N slots using the same transmit sector so that the UE may receive each slot while sweeping through all of its N sectors, one for each slot. The diagram shows as sequence of slots 128-1 to 128-N.

This transmission sequence is repeated for each UE as shown by the next sequence of BS transmit slots 130-1 to 130-N for the last UE 114-K. If there are multiple UEs for which the BS has determined the same receive sector to be best, then all of these UEs may receive the same sequence of transmit slots and sweep through their own sectors at the same time. The UEs use this information to select a best receive sector based on transmission from the BS's best transmit sector. Even though two UEs have the same best BS transmit sector, they may best receive that signal on different UE receive sectors.

In some embodiments, the same FIG. 1 structure is used during all of the slots described herein. In these sector sweep calibration operations, there is no data to transmit until the antenna calibration is completed. Much of the data in the control and data section may be known sequences to improve the quality of the training. However, control data may also be transmitted. Control data sections usually have many known bits together with configuration and assignment bits so that control data may readily be used for training.

Summing up there are two parts of the sector sweep process and a third and fourth optional part. The first part process 140 with BS Tx messages 122-1 to 122-N will be referred to as the BS Tx Sector Sweep 140. The second part 142 with UE Tx messages 124-1 to 124-N will be referred to as the UE Tx Sector Sweep. The third optional part 144 with messages 128-1 to 128-N will be referred to as the UE Rx Sector Sweep. The fourth optional part 146 will be referred to as the BS Rx Sector Sweep. Each of these parts of the sector sweep process are described below in more detail.

BS Tx Sector Sweep Procedure 140

This next set of signals is part of a process that allows the BS to select the best BS Tx sector for each UE. The process uses the UEs to measure the quality of the BS signal received from each BS transmit sector. Since the UEs act as passive receivers, all of the UEs may receive and measure the same BS signals. In some embodiments, the BS uses directional transmit antennas while each UE uses omni-directional receive antennas. As shown in FIG. 2, there are M BS Sector Tx sector slots, each with a different transmit beam direction. The BS can indicate a sector index by using different sequence or control information in each transmitted slot. As the BS transmits the slots in each Tx sector, each UE compares the quality of each received slot and determines the best BS transmit sector.

In addition to comparing the signal quality, each UE is also able to obtain system information and time synchronization at least at a superframe level. In addition, the BS may include control information in the transmitted slots. The control information carried in the control symbols in each BS Tx sector slot may include: base station identification; system bandwidth; number of BS transmit antennas; superframe configuration such as the number of BS Tx sectors, the number of UE Tx sectors, the number of UE Rx sectors, the number of data slots, the data slot configuration, etc.; and BS Tx sector identification for each beamforming setting as it is being sent.

The base station may assume the role of the initiator as defined in specifications such as IEEE 802.11ad and similar specifications. It transmits reference packets in each of its sectors sequentially. Each UE then assumes the role of responder to the BS initiator and correlates the received signal with the known sequences in each time slot. It then determines the maximum of the measured values. Alternatively, each UE measures the received signal strength in each time slot and determines the maximum of the measured values. If the maximum obtained value is greater than a given threshold, each UE will then select a best base station transmit sector. The best transmit sector is the one with the best received signal. This may be the best received signal strength indicator (RSSI), the best signal-to-noise ratio (SNR), the best bit error rate (BER), or the best of some other or similar measure. Alternatively, several of these measures may be combined in order to select the best BS transmit sector.

Depending on the particular protocol being used, in this phase 140, the base station transmits a pilot packet with length $N_p$, denoted by $S_{SSSW,s1}(n)$, n=1, 2 ... $N_p$, in all of its sectors sequentially. As mentioned, the BS uses sector transmission, while the UE uses omni-directional antennas.

In addition to measuring quality and selecting a sector, the UE may optionally estimate the best channel and calculate a best or rank-1 precoding vector, supportable rank and corresponding best precoding matrix during this process 140. Precoding in this context refers to digital beamforming.

UE Tx Sector Sweep Procedure 142

As described above an optimal BS Tx and, by reciprocity, a BS Rx sector may be determined. After this an optimal Tx sector may be determined for the UEs. This is also used to infer an optimal UE Rx sector by reciprocity. Each UE performs a UE transmit sector sweep procedure 142 simultaneously. In this procedure, UEs use a directional antenna configuration while the BS may use an omni-directional antenna configuration. There are N UE TX Sector Tx sector slots with different transmit beam direction. While in this embodiment, the number of BS Tx sectors is the same as the number of UE Tx sectors, identified as N, this is not necessary.

This part 142 may have at least two goals. First, the UE will feed back to the base station the best BS transmit sector as received at the UE in the BS Tx Sector sweep 140. Second, this part 142 also allows the base station to determine the UE's best transmit sector. In this procedure, the base station may use omni-directional antennas. Mirroring the first step, the UE, instead of the BS, transmits reference packets in each of its N UE TX sectors sequentially.

In each UE Tx sector slot, the UE may also transmit control information such as a UE identification, this may be a temporary ID if the UE is not yet associated with a BS or registered to the system, the best BS Tx sector identification from 140, a bandwidth request, a UE Tx sector identification, and a BS ID for the intended BS targeted for the sweep. Other information may also be transmitted by the UE. As examples, if the UE has already made an estimation of these factors, then a best rank-1 precoding vector, the supportable rank, and corresponding best precoding matrix also may be transmitted. Synchronization information may also be included such as information to help other devices within range to determine superframe level synchronization may be included in the control information.

As mentioned, the UE Tx sector sweep procedure 142 may be performed by all of the UEs that seek to communicate with a particular BS at the same time. This may cause collisions when the UEs are physically located at about the same location or if there is very strong multipath interference. With many receive antennas, the BS is able to resolve simultaneous signals from different UEs that are not located very close together. When all of the UEs transmit at the same time instead of one at a time, the sector sweep procedure is made much quicker because fewer slots are used to allow all of the UEs to transmit.

Even though several UEs may transmit simultaneously, the BS may also be able to distinguish each UE because different UEs will have different best BS Rx sectors and different best UE Tx sectors which will cause different received power levels at the BS. As a result, not all of the UE signals will be at the maximum received power level during the same slot. In addition, there will be different transmit sequences based on the included control data. To further aid the BS a cyclic prefix may be used as a header to the data in which a known sequence is cycled with different transmit timings from different UEs. The cyclic prefix may be longer for the sector sweep process than for data transmission in order to provide greater help to the BS in resolving the signals. As another aid, the BS may estimate the received channels and calculate a best rank-1 precoding, supportable rank, and corresponding best precoding matrix for each UE. These may be applied to the received signals to more clearly distinguish simultaneous signals from different UE.

There are several different measures that may be taken by UEs to reduce collisions between UEs transmitting during the same slot. Different UEs may take different measures, depending on the status and the configuration of each UE. A UE may also take multiple or no measures to reduce collisions. Some possible measures are described below.

First each UE may select a sequence index using a unique or characteristic criterion. There are N transmission slots and the signals are sent during each slot from each UE in order. This may cause all of the UEs to transmit using the same sectors in the same order. Without changing the ordering, the start sector may be modified so that different UEs are transmitting using different Tx sectors at the same time. The first Tx sector may be selected in different ways, such as randomly, according to the best BS transmit sector index from the BS Tx sweep, according to a user index stored at the UE, according to base station index received from the BS, or a combination of any one or more these criteria. Other criteria may be used instead.

A second way to reduce collisions is to prevent some of the UEs from transmitting during some of the UE Tx sweep cycles. Criteria may be established that must be satisfied before a UE is allowed to transmit during a particular cycle of the UE Tx sector sweep. Some criteria that may be used include that the UE is new to the BS. Such a UE does not have any sector sweep information and is not configured for communication with this BS.

Another criterion is that the UE has not updated its sector sweep information for some number of superframes. The sector sweep information is stale and may be wrong. The network will function with less noise and interference if all of the UEs periodically update their sector sweep information.

Another criterion is that the UE has participated in the BS Tx sector sweep and has changed its selected best BS Tx sector. This indicates a change in the radio environment, perhaps caused by the UE moving. Such a change should result in new UE Tx sweep information being determined.

Another criterion is that the UE has data to send. The UE will then typically make a bandwidth request. Since this may be done during the UE Tx sector sweep, the bandwidth request is accommodated by the participation of the UE in the Tx sector sweep cycle. Even when a UE does not have data to send, the BS may have data to send. Accordingly, the UE Tx sector sweep is updated periodically whether or not there is data to send at the UE.

Collisions may also be reduced by reducing the number or transmit slots used by a UE during the UE Tx sector sweep. While this part 142 has N slots available, one for each UE sector, most of those sectors will not be very close to the optimal sectors for the UE and BS combination. To reduce the number of Tx sectors, the UE may estimate a best sector and then only transmit in sectors that are near the estimated best sector. One way to estimate a best Tx sector is to estimate angle of arrival (AoA) for the received BS Tx sector sweep. The UE may transmit only in Tx sectors around the estimated AoA. This reduces search space and/or collision probability.

In order to reduce collision probability, UE may also change the order of the UE Tx sectors after each cycle. Accordingly, even though signals from different UEs may collide with each other in one UE Tx sector sweep procedure. In the next cycle the ordering is different so that the UEs are not transmitting the same signals at the same time. The same collision circumstances will not exist again so the same collision will not occur in the next cycle.

This change in the ordering is particularly effective if a UE has fewer Tx sectors than there are slots allocated for the UE Tx sector sweep. If the reordered sector index is greater than the maximum UE Tx sector index, then the UE will not be transmitting in some of the same sector slots as in the previous cycle or superframe. This can help to reduce collision probability especially when different UEs have differing numbers of antennas. As an example, if a UE has many antennas, then it will have many UE Tx sectors and each sector will have a comparatively narrow beam width. On the other hand, a UE with a small number of antennas, will have a comparatively smaller number of UE Tx sectors, each with comparatively broader beam width. In both cases, each UE's signal will arrive at the BS with enough power only in a few of the sector slot times.

UE Rx Sector Sweep Procedure 144

After the UE Tx sector sweep procedure 142, the transmission parameters may be further refined with an optional UE receive sector sweep procedure 144. In the first part 140, the UE has determined an optimal BS Tx sector based receiving signals from the BS. In the second part, the BS has determined an optimal UE Tx sector based on receiving signals from the UE. This may be enough for high quality, high data rate transmissions between the two nodes. In this third optional part 144, the BS transmits using its optimal Tx sector and the UE determines its own optimal UE Rx sector. In this procedure, both the BS and the UE use directional antennas.

There are N UE Rx sector slots each with a different receive beam direction. In this procedure, the UE receives at each of the N sectors and selects a best receive sector. The UE correlates and measures the received signal in each of its N UE Rx sectors sequentially. In some embodiments the BS transmits continuously from its selected optimal Tx sector and the UE changes sectors so that there is one packet of BS signal per sector. The UE takes the sector which resulted in the optimum value, to be its best receive sector. The value may be applied to a threshold so that only signals with measurements higher than a given threshold are accepted. A variety of different measurements may be used as described above to determine which received signal is the best. These measurements may also be combined.

The selection of the best Rx sector does not need to be reported back from the UE to the BS because the information is only used in receiving by the UE. The particular information communicated between the two nodes may be modified to suit different implementations.

The BS sends a different sequence of N slots 128-1 to 128-N to each UE. The BS sends a first sequence of N slots 128-1 to 128-N to a first UE All of these slots are sent from the same BS Tx sector which was determined to be optimal for that UE. The first UE then sweeps its directional antennas through its sectors and measures each signal. After this, the BS sends a second sequence of N slots 130-1 to 130-N to a second UE using the best BS Tx sector for the second UE.

The optimal Tx sector for each UE is from the first part, the BS Tx sector sweep using information reported back each UE.

Since the slots are directed to a particular UE, they may be used to transmit additional system and communications information, such as control information to the corresponding UE. This information may include a best UE Tx sector index, a best rank-1 precoding vector, a supportable rank and a corresponding best precoding matrix. These are sent in these slots to each successive UE using the directional antennas of the BS. While these values are referred to as best or optimal herein, there may be other parameters that are better in certain respects than the ones that are selected or communicated as being "best." This UE Rx sector sweep procedure 144 is done for each UE in a different set of slots for each UE unless the best BS Tx sectors for two or more different UEs are same. If two or more UEs share the best BS Tx sector, then both may receive the same signal and perform a similar sweep to each find a best respective Rx sector. The BS may still transmit control information and parameters during the procedure by using a header or other identifier to identify the UE to which the parameters apply. When the BS indicates the best UE Tx sector id and the precoding codebook, then the UE may operate without transmit and receive antenna calibration relying instead on this information.

If there is no UE Rx sector sweep procedure 144 and a UE does not have the best UE Tx/Rx sector index information prior to receiving a downlink data packet, then the UE receives a data slot or packet using its omni-directional antennas. In such a situation, the BS may inform the UE of a best UE Tx sector index in a control part of the data slot. In order to reduce the packet error rate, for the first few packets before the best sectors are fully determined, the BS may select a low modulation and coding scheme (MCS) for these data packets.

BS Rx Sector Sweep Procedure 146

A fourth optional operation is a BS Rx sector sweep. In some embodiments this may be done using the selected UE Rx sector as a UE Tx sector. During the UE Rx sector sweep procedure 144, the BS is not determining its best receive sector. This procedure 144 is focused on the downlink. An additional optional BS Rx sector sweep procedure 146 may be used to select a best BS Rx sector.

In this optional BS Rx sector sweep procedure 146 both the BS and the UE use directional antennas. There are M BS Rx sector slots with different receive beam directions. The BS determines a best receive sector as the UE transmits from its selected best transmit sector as determined from its UE Tx sector sweep 142. The BS correlates and measures the received signal in each of its M BS Rx sectors sequentially using one packet per sector, for example. The BS then takes the sector which resulted in the maximum or best value, if greater than a given threshold, to be its best receive sector. This is an uplink version of the downlink sweep of the UE Rx sector sweep 144. Each UE transmits slots from its best Tx sector until all of the UEs have transmitted and the BS has determined a best Rx sector for each UE. As with the UE Tx sector sweep, UEs may transmit to the BS simultaneously.

Figure 3:
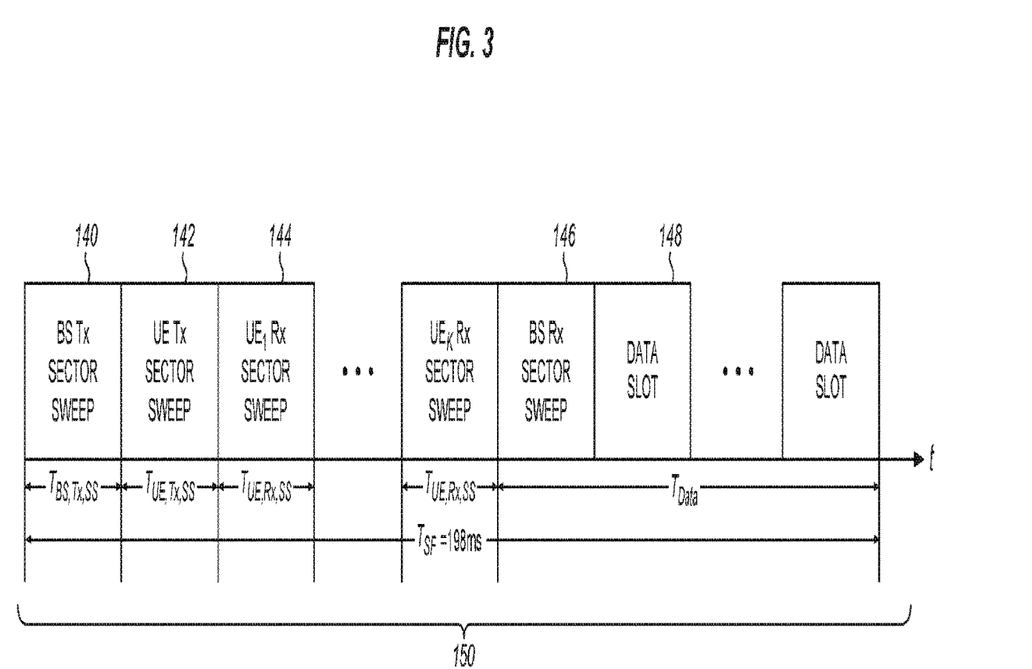
FIG. 3 is a diagram of a superframe including sector sweep slots according to an embodiment.

FIG. 3 is a signal timing diagram to show the sector selection in the context of a superframe structure. The superframe 150 starts with the BS Tx sector sweep slots 140. This is followed by the UE Tx sector sweep slots 142. As mentioned in the first sweep, the BS transmits to all UEs simultaneously. Similarly in the second sweep, the UEs all transmit to the same BS simultaneously. There are several different collision mitigation techniques that may be used for this sweep. This is optionally followed by the UE Rx sector sweep slots 144. For this sweep the BS transmits as many sets of slots as are necessary to use the selected optimal BS Tx sector for each UE. The third sweep is optionally followed by the BS Rx sector sweep 146. In this fourth sweep the UEs again may all transmit simultaneously to the one BS. As mentioned above, collision mitigation techniques may also be used in this sweep. Alternatively, the collision mitigation techniques are not used and the UEs transmit simultaneously. When the UEs use appropriate Tx sectors, the effects of collisions are reduced. Data slots 148 follow the sweeps to allow any UEs to which permission has been granted to communicate with the BS for the rest of the superframe. The slot structure for each slot is shown in FIG. 1, although the embodiments are not so limited.

Figure 4:
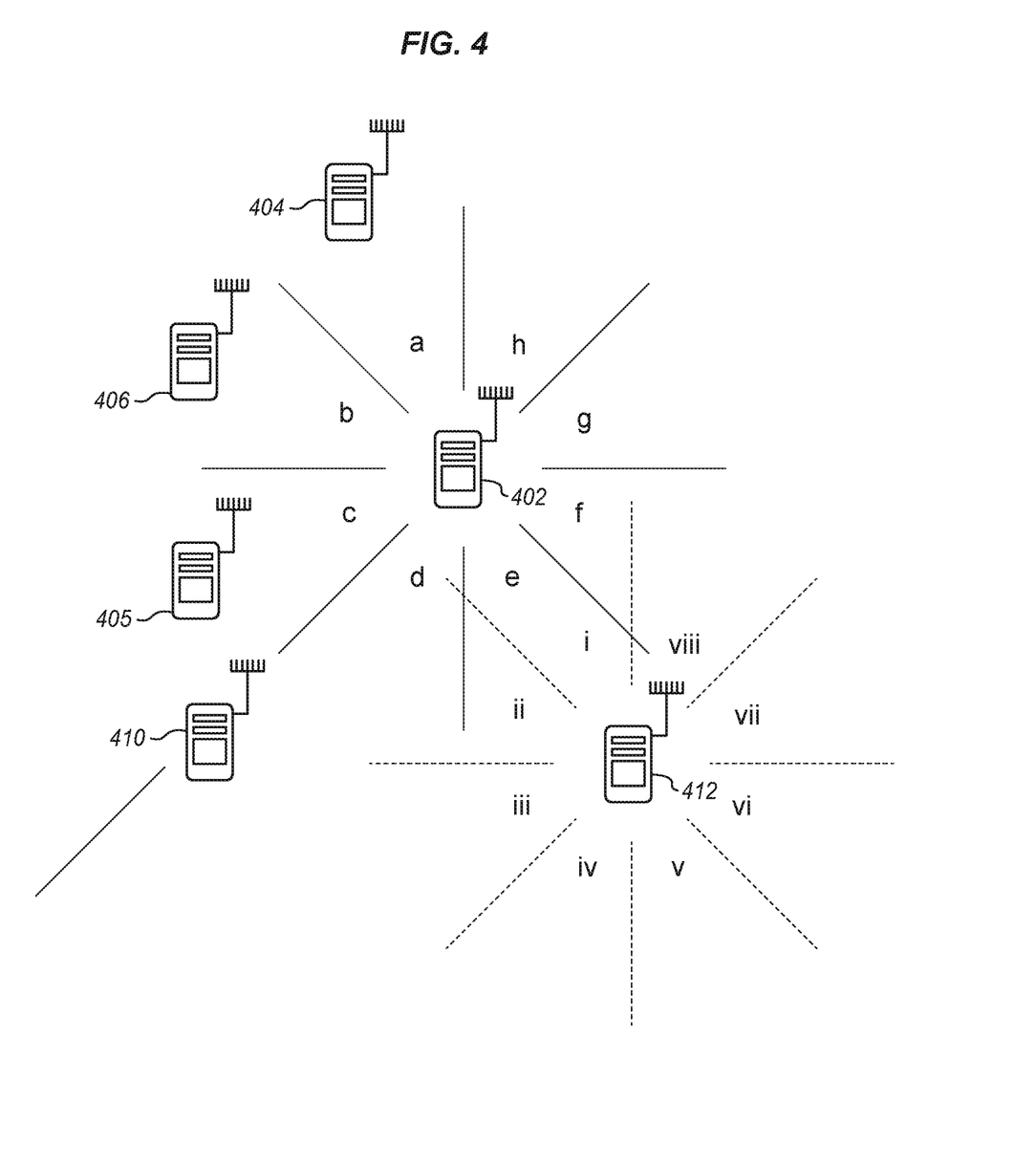
FIG. 4 is a diagram of a BS and UEs with transmit and receive sectors according to an embodiment.

FIG. 4 is a diagram of a BS and UEs in a use scenario for the signals described above. The diagram is not to scale and is simplified. There may be more or fewer UEs and there may be other nearby BSs interfering with the UEs. The BS may be coupled to a backplane, a wide area network, a system controller and other equipment for management, registration, and data communication with external devices. In this example, there is a single BS 402 with a multiple element directional antenna. The directional antenna is configured to transmit and receive in eight different sectors, a to h, although in a real system there may be many more. Each sector corresponds to one eighth or 45° of a horizontal circle surrounding the BS. Each sector extends to all relevant elevations and is the same size e.g. 45°, although the embodiments are not so limited.

Five UEs 404, 406, 408, 410, 412 surround the BS, each with a multiple element directional antenna. The UEs are each in a different sector except that there are two in sector c. The fourth UE is close to the border between sector c and d and may be able to operate in both sectors. Each of the UEs also transmits and receives within sectors. This is shown for the fifth UE 412 with eight 45° sectors labeled i to viii. The BS antenna is within sector i, so that when the fifth UE performs a sweep, sector i will likely be selected as the best or optimal.

For a real application, there may be more or fewer sectors for both the BS and for the UEs. The UEs may have different numbers of sectors from other UEs. While in some cases a line of sight direction may provide the best results in a sector sweep, in other cases, a reflected or multipath combination signal may provide the best signal.

In summary, as described above a sector sweep procedure begins with a BS Tx sector sweep procedure, and is then followed by a UE Tx sector sweep procedure. The BS Tx sector sweep procedure allows each UE to determine an optimal Tx sector for the BS to use to transmit to that UE. The UE sector sweep procedure uses this information transmitted by the BS during the BS sector sweep procedure. The UE Rx sector sweep procedure allows the BS to determine an optimal UE transmit sector for the UE to use to transmit to the BS. After these procedures, the BS and the UE have established optimal sectors for transmission to each other. Using reciprocity, these same sectors may be used to receive from each other as well.

However, in some cases, reciprocity does not hold because the transmitter and receiver at the BS may be different from the transmitter and receiver at the UE. Reciprocity may also break down if the uplink and the downlink use different frequencies or difference MCS. In order to adjust for and accommodate such differences, after the UE Tx sector sweep procedure, there may be an optional UE Rx sector sweep procedure, depending on the particular implementation. In the UE Rx sector sweep procedure, the BS uses information such as an optimal transmit sector. This allows the UE to determine an optimal UE receive sector. The UE Rx sector sweep procedure may be followed by an optional BS Rx sector sweep procedure to allow the BS to determine an optimal Rx sector for each UE. When the BS has a better Rx antenna array and better processing, this fourth operation is the least important of the four.

In order to reduce collisions, the number of UE in the UE Tx sector sweep procedure may be limited by certain conditions. Accordingly, in such an embodiment a UE participates only if a certain one or more conditions are met. One such condition is that the UE did not perform a sector sweep procedure for more than a predefined duration. Another possible condition is if the UE determined a different best BS Tx sector in the current UE Tx sector sweep than in a previous BS Tx sector sweep procedure. Another possible condition is if the UE has new data to send.

Collisions may also or alternatively be reduced by some of the UEs changing the transmit sector order for its UE Tx sector sweep procedure. For each superframe a particular UE operates its own Tx sector sweep by switching from one sector to the next in a different order. A different beam steering vector is used for each slot in the current superframe than was used in the last superframe. The order may be changed or the UE may use the same order but a different starting point. As described above a superframe starts with the BS Tx sector sweep procedure and is then followed by the UE Tx sector sweep and then the data.

In some cases the UE does not transmit in all of the available UE Tx sweep sector slots. The UE may have fewer transmit sectors than there are slots or the UE may transmit only in those slots that are closest to the optimal UE Rx sector. A UE may have fewer sectors than there are slots due to a different antenna design. In some cases, for example, the superframe may be designed to accommodate UEs having more antennas than other UEs. These other UEs will have fewer sectors. The optimal UE Rx sector may be determined during the BS Tx sector sweep in the same superframe or during communication during a previous superframe.

Figure 5:
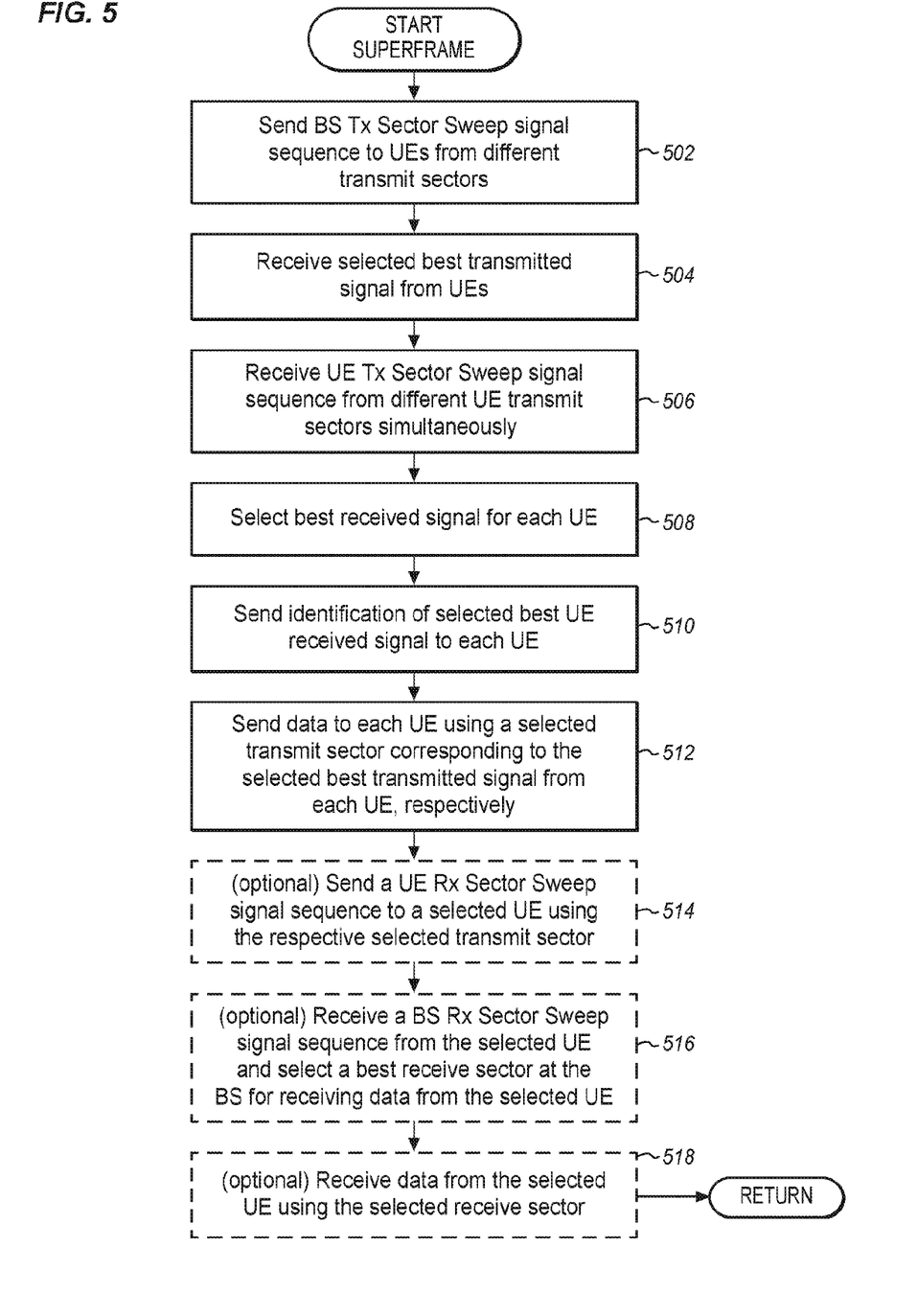
FIG. 5 is a process flow diagram of sector sweeps for a BS according to an embodiment.

FIG. 5 is a process flow diagram of the sector sweep procedures above from the perspective of the BS. The process starts with a new superframe. In the described examples, the superframe begins at 502 wherein the BS sends the BS Tx Sector Sweep signal sequence to all of the UEs simultaneously. Each signal in the sequence is sent from a different transmit sector of the BS. The superframe may have additional sections before this sequence, depending on the particular implementation. The UEs receive these signals using omni-directional antenna configuration. Depending on the UE, the UE may be able to estimate a receive sector using these signals.

At 504 the BS receives a selection from each UE of the best transmitted signal that the UE received in the sequence. The BS may then map these selections to the transmit sector used for that signal. This allows the BS to generate a map of transmit sectors and UEs. The BS may use the corresponding transmit sector for the particular UE for all later transmissions or at least until the next process at the next superframe.

At 506 the BS receives a UE Tx Sector Sweep signal sequence from each participating UE. Each UE transmits from one or more of its sectors and it transmits simultaneously with other UEs. As described above, in some cases not all UEs transmit and not all of the transmitting UEs transmit during each slot of the sequence. The structure of the superframe and the slots for transmitting the UE Tx Sector Sweep signals may be sent to the UEs during the BS Tx sector sweep signal sequence or at another time. Similarly, the selection of a best received signal may be sent by each UE within the UE Tx Sector Sweep signals.

At 508, the BS selects the best received signal from within the sequence received for each UE and at 510 this identification is sent to each UE. With the best transmit sectors determined for the BS and for the UE, the two radio nodes are able to transmit to each other using their directional antennas.

At 512 the BS sends data to each UE using the selected transmit sector corresponding to the selected best transmitted signal from each UE, respectively.

The communication channels may be further enhanced by selecting receive sectors for the BS and the UE. Alternatively, the two nodes may use reciprocity to select a receive sector based on the determined transmit sectors.

At 514 the BS optionally sends a UE Rx Sector Sweep signal sequence to a selected UE using the respective selected transmit sector for that UE. The UE may use this sequence to change its own receive sectors and select a best Rx sector. At 516 the BS optionally receives a BS Rx Sector Sweep signal sequence from the selected UE and selects a best receive sector at the BS for receiving data from the selected UE. At 518 this selected receive sector is optionally used to receive data from the selected UE. As a further alternative, the receive sector selection may be optimized during data slots. The selection may be optimized from a prior determination from a reciprocity based determination or from a determination made using the Rx Sector Sweep signal sequence.

After the communication of data, if necessary, then the process returns to the start of a new superframe.

Figure 6:
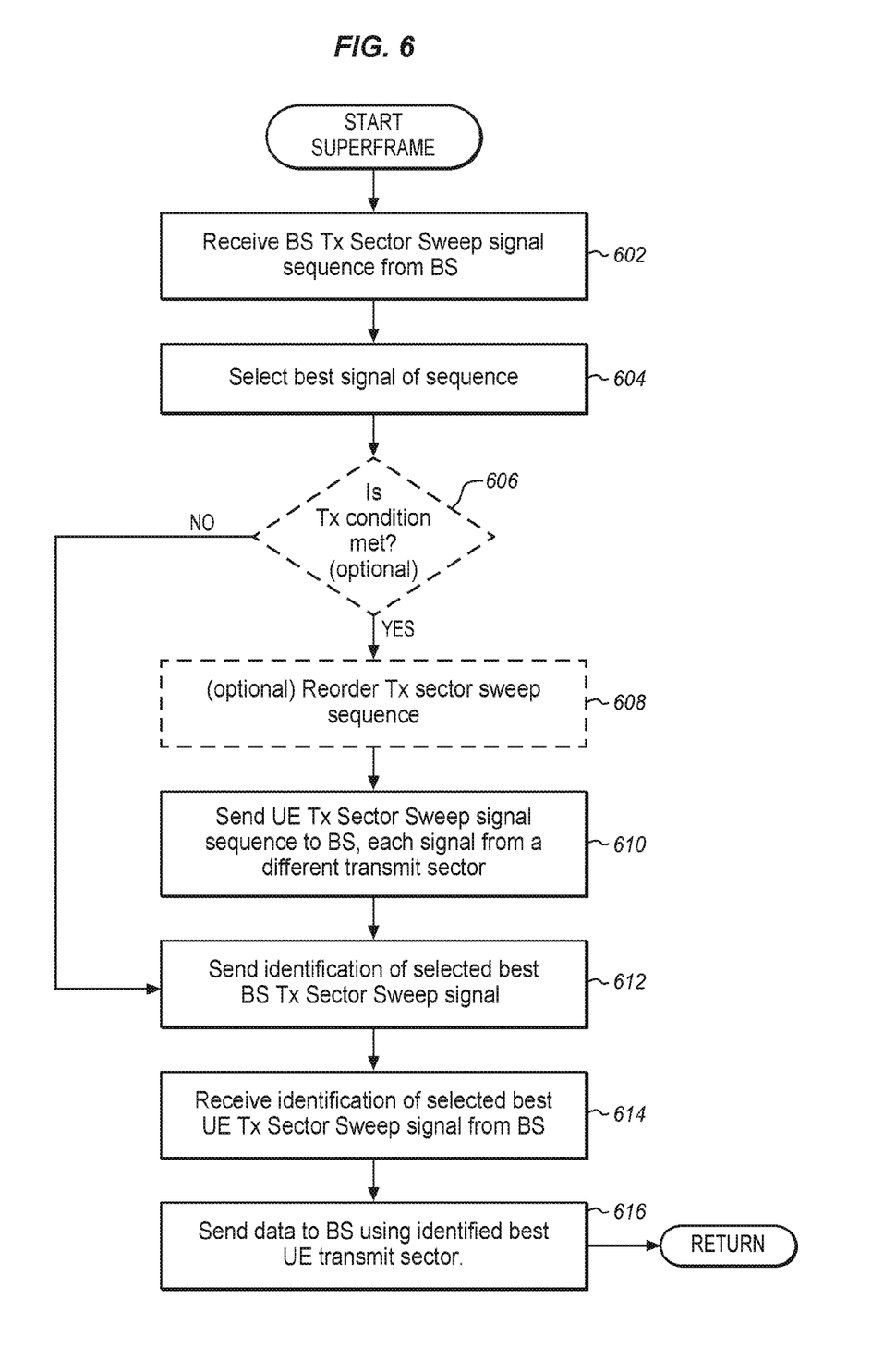
FIG. 6 is a process flow diagram of sector sweeps for a UE according to an embodiment.

FIG. 6 is a process flow diagram of the sector sweep procedures above from the perspective of the UE. This sequence also starts at the beginning of a superframe but the ordering and configuration of the superframe may be modified to suit different implementations. From the UE's perspective at 602 the UE receives the BS Tx Sector Sweep signal sequence using an omni-directional setting for its antenna array. At 604 the UE selects the best signal of Tx Sector sweep sequence. As mentioned above, each signal was transmitted from a different transmit sector of the BS. The best signal will correspond to the best Tx sector of the BS for the UE.

At 606 the UE determines whether to transmit a UE Tx Sector Sweep sequence by testing a condition. If the condition is not met, then no sequence is sent. If the condition is met then the sequence is sent at 608. Before sending the sequence, the UE may optionally reorder the sequence of the sectors in its Tx sector sweep sequence. The sequence may be reordered by changing the ordering of the sectors or by using the same ordering but starting with a different transmit sector. A random number or a number unique to the UE may be used to move to a different sector in the sequence or to change the ordering of sectors within the sequence.

Any of a variety of different conditions may be tested at 606. Multiple conditions may be used to further reduce the likelihood that the UE will transmit its UE Tx Sector Sweep sequence. One condition is that a time duration since a previous time at which the UE sent a sequence of UE transmit sector sweep signals is greater than a predefined threshold. IN some cases this may mean that the UE has not sent a UE Tx Sector Sweep sequence for some large number of superframes. By sending the sequence its parameters may be updated. Those that have recently sent the sequence may already be up to date.

Another possible condition is that the UE has selected a different best transmitted BS signal than at a previous time at which the UE selected a best transmitted BS signal. This suggests that the radio channel between the two nodes has changed and the UE Tx Sector should also be updated. The channel may change because the UE has moved or because of a change in the environment, for example, an obstruction has come between the UE and the BS or an interferer has come near to either the UE or the BS.

Another possible condition is that the UE has new data to send to the BS. If the UE has no data to send then it is less important for its Tx parameters to be updated. A similar condition is that the BS has no data to send. These conditions may be combined. In a data communication both terminals will send because the one terminal will acknowledge data sent by the other terminal. Accordingly, in this example the Tx parameters may be updated if either the BS or the UE has data to send.

At 610 if the conditions are met or if no test is performed at 606, then the UE sends its own UE Tx Sector Sweep signal sequence to the BS. In this sequence, each signal is sent by the UE from a different transmit sector using its multiple antenna array. The BS is able to compare these signals to determine which Tx sector is best.

At 612 the UE sends its identification of the selected best BS Tx Sector Sweep signal to the BS. This may be done as data within the UE Tx Sector Sweep signals. At 614 the UE receives an identification of the selected best UE Tx Sector Sweep signal from the BS. The UE may then map this signal identification to a particular Tx sector.

At 616 the UE sends data to the BS using the identified best UE transmit sector in the data slots of the superframe. Control information may also be sent and received. The UE will also receive data from the BS.

To further enhance the signal reception, the UE may receive a UE Rx Sector Sweep signal sequence from the BS. The UE cycles through its Rx sectors as it receives these signals from the BS and then selects the Rx sector with the best signal. As yet a further enhancement the UE may send a BS Rx Sector Sweep signal sequence to the BS from its selected best Tx sector. This allows the BS to sweep through its Rx sectors to select a best Rx sector for the UE. These two additional sequences require more slots to be used for overhead instead of for data and therefore may not be used in all cases.

After the communication of data, if necessary, then the process returns to the start of a new superframe.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
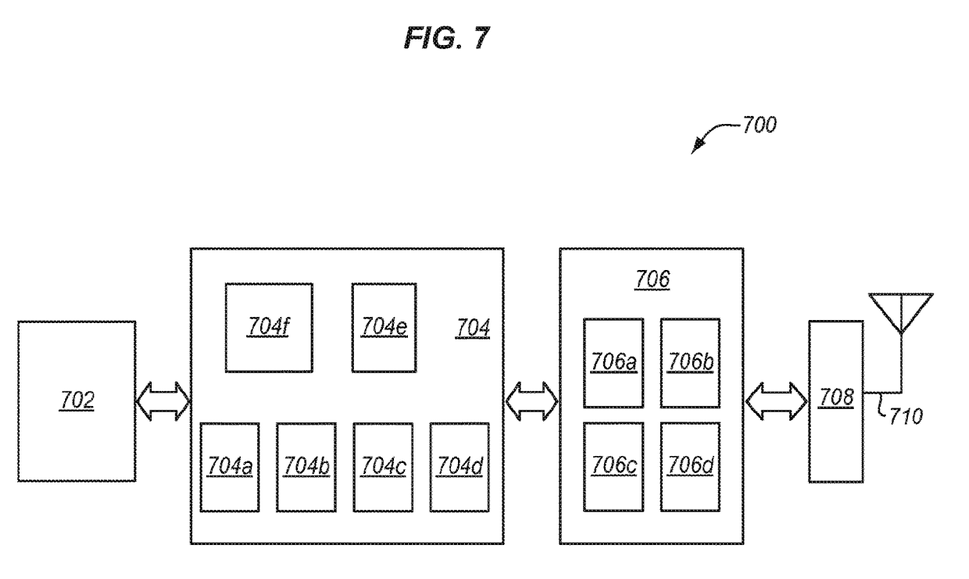
FIG. 7 is a block diagram of a radio node, such as a BS or UE according to an embodiment.

Embodiments described herein may be implemented into a system using any suitably configured hardware and/or software. FIG. 7 illustrates, for one embodiment, example components of a User Equipment (UE) device 700 or a BS. In some embodiments, the UE device 700 may include application circuitry 702, baseband circuitry 704, Radio Frequency (RF) circuitry 706, front-end module (FEM) circuitry 708 and one or more antennas 710, coupled together at least as shown.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some embodiments, the baseband circuitry 704 may include a second (2G) and third generation (3G) baseband processor 704a, a fourth generation (4G) baseband processor 704b, and/or other baseband processor(s) 704c for other existing generations, generations in development or to be developed in the future (e.g., fifth generation (5G), 6G, etc.).

The baseband circuitry 704 (e.g., one or more of baseband processors 704a-c) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers.

In some embodiments, the baseband circuitry may include one or more audio digital signal processor(s) (DSP) 704f. The audio DSP(s) 704f may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

The baseband circuitry 704 may further include memory/storage 704d. The memory/storage 704d may be used to load and store data and/or instructions for operations performed by the processors of the baseband circuitry 704. The data and instructions may be read by the processors and are stored in a computer-readable format in the memory or storage medium of 704d or in the individual processors or elsewhere to cause the processors to perform the operations described herein. Memory/storage for one embodiment may include any combination of suitable volatile memory and/or non-volatile memory. The memory/storage 104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710.

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

EXAMPLES

In some examples, the UE device 700 may include additional elements such as, for example, memory/storage, display, camera, sensor, and/or input/output (I/O) interface. In Example 1 where the electronic device 700 is, implements, is incorporated into, or is otherwise part of a UE, the memory/storage may have instructions that when executed cause the UE to receive a sequence of base station transmit sector sweep signals from a base station (BS) at the UE, each signal being transmitted to a different transmit sector from a multiple antenna array of the BS, select a best transmitted signal at the UE from among the received signals, send a sequence of UE transmit sector sweep signals to the base station from the UE, each signal being transmitted to a different transmit sector from a multiple antenna array of the UE, send an identification of the selected best base station transmit sector sweep signal to the base station, receive an identification of a selected best UE transmit sector sweep signal from the base station and send data to the BS using the identified best UE transmit sector.

In Example 2 the subject matter of Example 1 or any of the Examples described herein receiving may further include receiving using an omni-directional configuration of the UE antenna array.

In Example 3 the subject matter of Example 1 or any of the Examples described herein sending an identification may further include sending the identification in a UE transmit sector sweep signal.

In Example 4 the subject matter of Example 1 or any of the Examples described herein may further include that the received signals carry superframe configuration information and an identification of a transmit sector for the signal.

In Example 5 the subject matter of Example 1 or any of the Examples described herein sending a sequence may further include sending a sequence simultaneously with other UEs to the same BS.

In Example 6 the subject matter of Example 1 or any of the Examples described herein may further include determining if a condition is met and wherein sending a sequence of UE transmit sector sweep signals comprises sending the sequence only if the condition is met.

In Example 7 the subject matter of Example 1 or any of the Examples described herein the condition may further include that a duration since a previous time at which the UE sent a sequence of UE transmit sector sweep signals is greater than a predefined threshold.

In Example 8 the subject matter of Example 1 or any of the Examples described herein the condition may further include that the UE has selected a different best transmitted BS signal than at a previous time at which the UE selected a best transmitted BS signal.

In Example 9 the subject matter of Example 1 or any of the Examples described herein the condition may further include that the UE has new data to send to the BS.

In Example 10 the subject matter of Example 1 or any of the Examples described herein sending a sequence of UE transmit sector sweep signals may further include sending the sequence in a different order than at a previous time.

In Example 11 the subject matter of Example 11 or any of the Examples described herein may further include that the different order has a different starting sector.

In Example 12 the subject matter of Example 1 or any of the Examples described herein may further include that a defined number of slots are allocated in a superframe for sending the sequence of UE transmit sector sweep signals and that sending the sequence of UE transmit sector sweep signals comprises sending the signals in less than all of the defined number of slots.

In Example 13 the subject matter of Example 1 or any of the Examples described herein may further include that the signals are sent only from sectors near a previously selected best UE transmit sector.

Example 14 pertains to baseband circuitry of a user equipment (UE) configured to process a sequence of base station transmit sector sweep signals from a base station (BS) at the UE, each signal being transmitted to a different transmit sector from a multiple antenna array of the BS, select a best transmitted signal at the UE from among the received signals, generate a sequence of UE transmit sector sweep signals to send to the base station from the UE, each signal being transmitted to a different transmit sector from a multiple antenna array of the UE, generate an identification of the selected best base station transmit sector sweep signal to the base station, process an identification of a selected best UE transmit sector sweep signal from the base station, and generate data packets to send to the BS using the identified best UE transmit sector.

In Example 15 the subject matter of Example 14 or any of the Examples described herein may further include radio frequency circuitry with a receive signal path coupled to the baseband circuitry and to multiple antennas of an array to receive the sequence of base station transmit sector sweep signals.

In Example 16 the BS device 700 may include additional elements such as, for example, memory/storage, display, camera, sensor, and/or input/output (I/O) interface. In some embodiments where the electronic device 700 is, implements, is incorporated into, or is otherwise part of a UE, the memory/storage may have instructions that when executed cause the BS to send a sequence of base station transmit sector sweep signals to a plurality of user equipment nodes (UEs) from a base station (BS) at a user equipment, each signal being transmitted from a different transmit sector from a multiple antenna array of the BS, receive a selection of a best transmitted signal at the UEs from among the sent signals, receive a sequence of UE transmit sector sweep signals to the base station simultaneously from the plurality of UEs, each signal being transmitted from a different transmit sector from a multiple antenna array of each UE, select a best received signal for each UE from among the received signals, send an identification of the selected best UE transmit sector sweep signal from the BS to each UE, and send data to the UE using a transmit sector corresponding to the selected best transmitted signal.

In Example 17 the subject matter of Example 16 or any of the Examples described herein receiving may further include receiving using an omni-directional configuration of the BS antenna array.

In Example 18 the subject matter of Example 16 or any of the Examples described herein may further include that the sent signals carry superframe configuration information.

In Example 19 the subject matter of Example 16 or any of the Examples described herein may further include sending a sequence of UE receive sector sweep signals to a specific UE using a sector corresponding to the selected best transmitted signal selected by the specific UE.

In Example 20 the subject matter of Example 16 or any of the Examples described herein sending an identification may further include sending the identification in the sequence of UE receive sector sweep signals.

In Example 21 the subject matter of Example 16 or any of the Examples described herein may further include receiving a sequence of BS receive sector sweep signals from the specific UE and selecting a best receive sector at the BS using the received BS receive sector sweep signals.

In Example 22 the electronic device 700 is, implements, is incorporated into, or is otherwise part of a BS, the baseband circuitry 704 and may be to generate a sequence of base station transmit sector sweep signals to send to a plurality of user equipment nodes (UEs) from a base station (BS) at a user equipment, each signal to be transmitted from a different transmit sector from a multiple antenna array of the BS, process a received selection of a best transmitted signal at the UEs from among the sent signals, process a sequence of UE transmit sector sweep signals sent to the base station simultaneously from the plurality of UEs, each signal being transmitted from a different transmit sector from a multiple antenna array of each UE, select a best received signal for each UE from among the received signals, generate an identification of the selected best UE transmit sector sweep signal to send from the BS to each UE, and generate data packets to send to the UE using a transmit sector corresponding to the selected best transmitted signal.

In Example 23 the subject matter of Example 22 or any of the Examples described herein may further include radio frequency circuitry with a transmit signal path coupled to the baseband circuitry and to multiple antennas of an array to send the sequence of base station transmit sector sweep signals.

Example 24 pertains to a User Equipment (UE) for selecting a transmit sector for a directional antenna, the UE that includes means for receiving a sequence of base station transmit sector sweep signals from a base station (BS) at the UE, each signal being transmitted to a different transmit sector from a multiple antenna array of the BS, means for selecting a best transmitted signal at the UE from among the received signals, means for sending a sequence of UE transmit sector sweep signals to the base station from the UE, each signal being transmitted to a different transmit sector from a multiple antenna array of the UE, means for sending an identification of the selected best base station transmit sector sweep signal to the base station, means for receiving an identification of a selected best UE transmit sector sweep signal from the base station, and means for sending data to the BS using the identified best UE transmit sector.

Example 25 pertains to a Base Station (BS) for selecting a transmit sector for a directional antenna, the BS that includes means for sending a sequence of base station transmit sector sweep signals to a plurality of user equipment nodes (UEs) from a base station (BS) at a user equipment, each signal being transmitted from a different transmit sector from a multiple antenna array of the BS, means for receiving a selection of a best transmitted signal at the UEs from among the sent signals, means for receiving a sequence of UE transmit sector sweep signals to the base station simultaneously from the plurality of UEs, each signal being transmitted from a different transmit sector from a multiple antenna array of each UE, means for selecting a best received signal for each UE from among the received signals, means for sending an identification of the selected best UE transmit sector sweep signal from the BS to each UE, and means for sending data to the UE using a transmit sector corresponding to the selected best transmitted signal.

What is claimed is:

1. One or more non-transitory computer-readable media having instructions that, when executed, cause a User Equipment (UE) to:
    receive a sequence of base station transmit sector sweep signals from a base station (BS) at the UE, each signal being transmitted to a different transmit sector from a multiple antenna array of the BS;
    measure the received base station transmit sector sweep signals;
    select a best transmitted signal at the UE based on comparing the measured base station transmit sector sweep signals;
    send a sequence of UE transmit sector sweep signals to the base station from the UE, each signal being transmitted to a different transmit sector from a multiple antenna array of the UE;
    send an identification of the selected best base station transmit sector sweep signal to the base station;
    receive an identification of a selected best UE transmit sector sweep signal from the base station; and
    send data to the BS using the identified best UE transmit sector, wherein a defined number of slots are allocated in a superframe for sending the sequence of UE transmit sector sweep signals and wherein sending the sequence of UE transmit sector sweep signals comprises sending the signals in less than all of the defined number of slots.

2. The media of claim 1, wherein receiving comprises receiving using an omnidirectional configuration of the UE antenna array.

3. The media of claim 1, wherein sending an identification comprises sending the identification in a UE transmit sector sweep signal.

4. The media of claim 1, wherein the received signals carry superframe configuration information and an identification of a transmit sector for the signal.

5. The media of claim 1, wherein sending a sequence comprises sending a sequence simultaneously with other UEs to the same BS.

6. The media of claim 1, further comprising determining if a condition is met and wherein sending a sequence of UE transmit sector sweep signals comprises sending the sequence only if the condition is met.

7. The media of claim 6, wherein the condition comprises that a duration since a previous time at which the UE sent a sequence of UE transmit sector sweep signals is greater than a predefined threshold.

8. The media of claim 6, wherein the condition comprises that the UE has selected a different best transmitted BS signal than at a previous time at which the UE selected a best transmitted BS signal.

9. The media of claim 6, wherein the condition comprises that the UE has new data to send to the BS.

10. The media of claim 1, wherein sending a sequence of UE transmit sector sweep signals comprises sending the sequence in a different order than at a previous time.

11. The media of claim 10, wherein the different order has a different starting sector.

12. The media of claim 1, wherein the signals are sent only from sectors near a previously selected best UE transmit sector.

13. A baseband circuitry of a user equipment (UE) for selecting a transmit sector for a directional antenna configured to:
receive a sequence of base station transmit sector sweep signals from a base station (BS) at the UE, each signal being transmitted to a different transmit sector from a multiple antenna array of the BS;
measure the received base station transmit sector sweep signals;
select a best transmitted signal at the UE from among the received signals based on comparing the measured base station transmit sector sweep signals;
generate a sequence of UE transmit sector sweep signals to send to the base station from the UE, each signal being transmitted to a different transmit sector from a multiple antenna array of the UE;
generate an identification of the selected best base station transmit sector sweep signal to send to the base station;
process an identification of a selected best UE transmit sector sweep signal from the base station; and
generate data packets to send to the BS using the identified best UE transmit sector, wherein a defined number of slots are allocated in a superframe for sending the sequence of UE transmit sector sweep signals and wherein sending the sequence of UE transmit sector sweep signals comprises sending the signals in less than all of the defined number of slots.

14. A user equipment (UE) comprising the baseband circuitry of claim 13 and further comprising radio frequency circuitry with a receive signal path coupled to the baseband circuitry and to multiple antennas of an array to receive the sequence of base station transmit sector sweep signals.

15. One or more non-transitory computer-readable media having instructions that, when executed, cause a Base Station (BS) to perform operations comprising:
send a sequence of base station transmit sector sweep signals to a plurality of user equipment nodes (UEs) from a base station (BS) at a user equipment, each signal being transmitted from a different transmit sector from a multiple antenna array of the BS;
receive a selection of a best transmitted signal at the UEs from among the sent signals, wherein the base station transmit sector sweep signals are measured at the UEs, and the best transmitted signal is selected based on comparing the measured base station transmit sector sweep signals; receive a sequence of UE transmit sector sweep signals to the base station simultaneously from the plurality of UEs, each signal being transmitted from a different transmit sector from a multiple antenna array of each UE;
select a best received signal for each UE from among the received signals;
send an identification of the selected best UE transmit sector sweep signal from the BS to each UE;
send data to the UE using a transmit sector corresponding to the selected best transmitted signal; and
send a sequence of UE receive sector sweep signals to a specific UE using a sector corresponding to the selected best transmitted signal selected by the specific UE.

16. The media of claim 15, wherein receiving comprises receiving using an omnidirectional configuration of the BS antenna array.

17. The media of claim 15, wherein the sent signals carry superframe configuration information.

18. The media of claim 15, wherein sending an identification comprises sending the identification in the sequence of UE receive sector sweep signals.

19. The media of claim 15, the operations further comprising receiving a sequence of BS receive sector sweep signals from the specific UE and selecting a best receive sector at the BS using the received BS receive sector sweep signals.

20. A baseband circuitry of a base station (BS) for selecting a transmit sector for a directional antenna configured to:
generate a sequence of base station transmit sector sweep signals to send to a plurality of user equipment nodes (UEs) from a base station (BS) at a user equipment, each signal to be transmitted from a different transmit sector from a multiple antenna array of the BS;
process a received selection of a best transmitted signal at the UEs from among the sent signals, wherein the base station transmit sector sweep signals are measured at the UEs, and the best transmitted signal is selected based on comparing the measured base station transmit sector sweep signals;
process a sequence of UE transmit sector sweep signals sent to the base station simultaneously from the plurality of UEs, each signal being transmitted from a different transmit sector from a multiple antenna array of each UE;
select a best received signal for each UE from among the received signals;
generate an identification of the selected best UE transmit sector sweep signal to send from the BS to each UE;

generate data packets to send to the UE using a transmit sector corresponding to the selected best transmitted signal; and send a sequence of UE receive sector sweep signals to a specific UE using a sector corresponding to the selected best transmitted signal selected by the specific UE.

21. A base station (BS) comprising the baseband circuitry of claim 20 and further comprising radio frequency circuitry with a transmit signal path coupled to the baseband circuitry and to multiple antennas of an array to send the sequence of base station transmit sector sweep signals.

* * * * *